3,816,414
o-ACYLAMINO-N-(2 - THIAZOLIN - 2 - YL AND 2-THIAZIN-2-YL) ANILINES AND DERIVATIVES THEREOF

Venkatachala Lakshmi Narayanan, Hightstown, and Rudiger Dieter Haugwitz, Titusville, N.J., assignors to E. R. Squibb & Sons, Incorporated, Princeton, N.J.
No Drawing. Filed Nov. 3, 1972, Ser. No. 303,448
Int. Cl. A61k 27/00; C07d 91/24, 93/06
U.S. Cl. 260—240 J                    10 Claims

ABSTRACT OF THE DISCLOSURE o-Acylamino - N - (thiazolin - 2 - yl and thiazin-2-yl) anilines and related compounds and their methods of preparation are disclosed. In addition, useful compositions and methods for employing said compositions as anthelmintics are taught.

---

This invention relates to compounds of the formula:

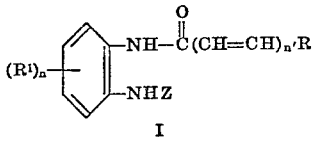

I wherein R is aryl, heterocyclic or lower alkyl; $R^1$ is hydrogen, lower alkyl, phenyl, benzyl, phenethyl, p-tolyl, nitro, fluoro, chloro, bromo, iodo, amino, lower alkylamino, dilower alkylamino, trifluoromethyl, cyano, lower alkylthio, arylthio, acyl, lower alkoxy or lower aryloxy; $n$ is one or two; $n'$ is zero or one and Z is

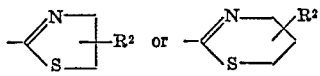

wherein $R^2$ is hydrogen, lower alkyl or phenyl.

In addition, this invention encompasses the methods for preparing said o-acylamino - N - (2 - thiazolin - 2 - yl and 2 - thiazin - 2 - yl) anilines, compositions containing said anilines and methods for using said compositions as anthelmintic agents.

The term "aryl" is intended to include phenyl, naphthyl, substituted phenyl wherein said substituent may be fluoro, chloro, bromo, iodo, nitro, trifluoromethyl, lower alkyl and lower alkoxy.

The term "lower alkyl" is intended to mean a straight or branched hydrocarbon fragment of from one to eight carbon atoms.

The term "lower alkoxy" is intended to mean a lower alkyl group linked through a single bond to oxygen.

The term "acyl" is intended to include aryl

and lower alkyl

The term "heterocyclic" is intended to encompass the following heterocyclic systems: furans, thiophenes, pyrroles, benzofurans, benzothiophenes, indoles, oxazoles, isoxazoles, thiazoles, thiadiazoles, oxadiazoles, triazoles, imidazoles, benzimidazoles, benzothiazoles, benzoxazoles, pyrimidines, pyridines, pyrazines, etc. The heterocycle may be linked to the carbonyl group by way of any available position, such as pyrrol-2-yl $-\overset{O}{\underset{\|}{C}}-$, indol-7-yl $-\overset{O}{\underset{\|}{C}}-$, and benzimidazol-5-yl $-\overset{O}{\underset{\|}{C}}-$ and may be unsubstituted or bear a lower alkyl group.

The compounds of this invention are prepared by acylating a compound of the formula:

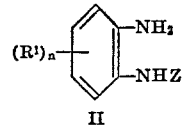

II wherein $R^1$ is hydrogen, lower alkyl, aryl, nitro, fluoro, chloro, bromo, iodo, trifluoromethyl, cyano, lower alkylthio, arylthio, acyl, lower alkoxy or lower aryloxy; and $n$ and Z are as previously described, utilizing compounds of the formulae:

$$R^3(CH=CH)_{n'} \cdot COZ \text{ or } [R(CH=CH)_{n'} \cdot CO]_2O$$

wherein Z is chloro or bromo; $R^3$ is aryl or heterocyclic and R is as previously defined.

While acylation with an acyl halide is preferred since so many of the necessary acyl halides are commercially available and the remainder can readily be prepared by reacting the corresponding carboxylic acid with thionyl chloride, the use of lower alkanoyl halides usually gives a diacylated product. Thus in order to introduce the lower alkanoyl group, the o-phenylenediamines (II) are reacted with lower alkanoyl anhydrides.

The acylation reactions are conducted in inert organic solvents, such as benzene, tetrahydrofuran, glyme, etc. utilizing the reactants in a molar ratio of from 0.8:1 to 1:0.8. Temperatures of from 0° C. to 90° C., preferably 10° to 30° C., are generally employed. Since the reaction is generally a very rapid one, usually periods of as short as 15 minutes are required in order to bring the reaction to near completion; however, the reaction time may be extended to 24 hours to insure the maximum formation of product, however a preferred time range is from 15 minutes to 4 hours.

Where an acyl halide is being employed, an acid acceptor is preferably added to the reaction medium. Bases such as triethylamine, pyridine, quinoline, sodium bicarbonate, potassium carbonate, etc., may be utilized for this purpose.

For the preparation of compounds wherein $R^1$ is amino, lower alkylamino and dilower alkylamino, the acylation reaction is carried out on the corresponding nitro compound. The nitro compound is reduced, preferably catalytically using a palladium on carbon catalyst in a solvent such as ethanol to give the desired amino substituted compound. In order to obtain the lower alkylamino and dilower alkylamino substituted compounds, the amino substituted compounds are alkylated by any of the standard alkylation procedures, such as the use of a lower alkyliodide.

The amino, lower alkylamino and dilower alkylamino substituted compounds are capable of forming salts. This invention is intended to encompass not only the amino, lower alkylamino and dilower alkylamino derivatives, but also their relatively non-toxic acid addition salts, such as the hyrochloride, sulfate, phosphate, acetate, citrate, tartrate, etc.

The preparation of the intermediate o-N-(2-thiazolin-2-yl or 2-thiazin-2-yl)phenylenediamine compounds (V) is described in the copending application Ser. No. 230,121, filed Feb. 28, 1972 which is incorporated by reference.

Thus the compounds of formula V are prepared by treating an o-phenylenediamine of formula III with a haloalkyl isothiocyanate of formula IV. The resulting hydrohalides V can be converted to the free base II, if desired.

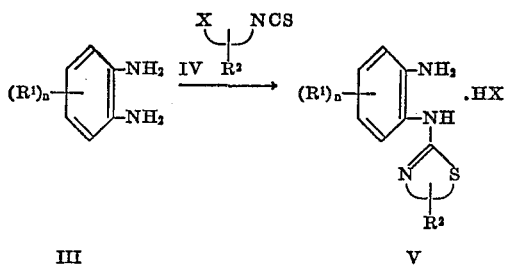

III            V wherein X is Cl or Br.

The above reaction may be carried out at a temperature within the range of from about 15 to about 150° C. in the presence of a hydrocarbon solvent such as benzene, toluene, glyme, ethyl ether, and the like, employing a molar ratio of III:IV within the range of from about 1:0.9 to about 1:1. The reaction proceeds in the absence of external base and surprisingly, mono-substituted products are obtained even though there are two potential reaction sites in the starting o-phenylenediamines III.

Alternatively, compounds of formula V can be prepared by reacting a monothiourea with an inorganic mineral acid such as hydrochloric acid, sulfuric acid or phosphoric acid to yield V. For example, this reaction can be illustrated as follows:

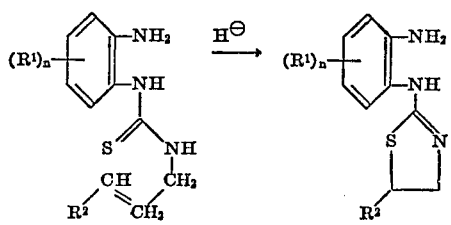

The starting o-phenylenediamines III can be prepared by methods reported in the literature as well as apparent to one skilled in the art.

The preferred compounds of this invention are those of the formula:

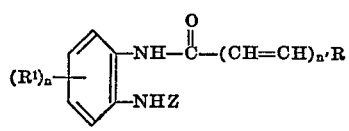

wherein R is

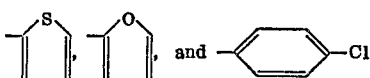

$R^1$ is hydrogen; n is one and z is

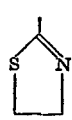

n is zero.

The compounds of this invention find utility as intermediates in the synthesis of certain anthelmintic compounds of the general formula VI which are the subject of copending Application Ser. No. 140,280, filed May 4, 1971 now U.S. Pat. No. 3,749,717.

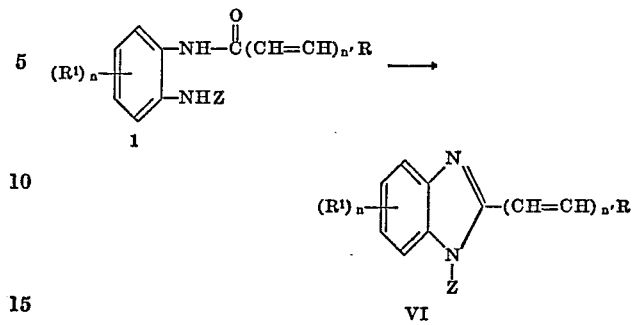

VI

R, $R^1$, Z and n are as previously described and wherein $n^1$ is zero. General methods for the conversion of the amides of formula I into the benzimidazoles of Claim VI is described in Weissberger, "The Chemistry of Heterocyclic Compounds, Imidazoles and its Derivatives," Interscience Publishers, Co., New York, 1953 and Elderfield "Heterocyclic Compounds," volume 5, John Wiley and Sons, New York, 1957.

In addition, the compounds described herein have anthelmintic activity and are useful in the treatment and/or prevention of helminthiasis, a parasitic disease which causes widespread and often serious infection is domesticated animals such as swine, horses, cattle, sheep and goats. In treating domesticated animals, the compounds are given orally and may be mixed with a nontoxic, edible carrier to form a feed supplement, or be administered in unit dosage forms such as powders, capsule, tablet, boluses, drenches, etc.

In general, the compounds of this invention (I) exhibit anthelmintic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. When the compounds are to be employed primarily as prophylactic agents for the prevention of helminthic infections, the preferred daily dose level is, of course, lower than the therapeutic level is, preferably in the range of about 10–70 mg. per kilogram of body weight.

When the compounds of this invention are to be administered in unit dosage form, capsules, boluses or drenches containing, the desired amount of anthelmintic distributed in a pharmaceutically acceptable vehicle are usually employed. These are prepared by intimately and uniformly mixing the active ingredient with the suitable finely divided diluents, suspending agents, fillers, disintegrating agents and/or binders such as starch, lactose, talc, magnesium stearate, vegetable gums and the like and are compounded by techniques generally known in the art.

The compounds of this invention may also be administered as a component of the feed of the animals or suspended in the drinking water. Thus, novel feed and feed supplement compositions may be prepared in which the compounds of this inveniton are present as an active anthelmintic ingredient. A typical feed supplement comprises the anthelmintic agent (5–50%, preferably 10–30%) intimately dispesred in or admixed with an inert carrier or dilutent, i.e. one that is nonreactive with respect to the anthelmintic agent and that may be administered with safety to the animals. The carrier or diluent is preferably one that is or may be an ingredient of an animal ration. This composition may be mixed with the feed to give any useful desired concentration, preferably about 0.1–2%. Lastly, feeds containing the active ingredient may be made directly by mixing said active ingredient in a feed which is inert to said anthelmintic compounds so as to give feeds having concentrations of anthelmintic agent of from 0.1–2%.

DETAILED DESCRIPTION

The following examples are provided for illustrative purposes and may include particular features of the invention; however, the examples should not be construed as limiting the invention, many variations of which are possible without departing from the spirit or scope thereof.

Example 1.—2-(o-Aminoanilino)-2-thiazoline

A solution of 7.8 g. (0.07 mole) of o-phenylenediamine and 11.9 g. (0.07 mole) of 2-bromoethyl isothiocyanate in 150 ml. of dry glyme is stirred at room temperature for one hour. The solvent is then decanted and the viscous oil that remains is taken up in water, basified with potassium carbonate and extracted with warm chloroform. The combined chloroform extracts are washed with water and cooled in an ice-bath. The crystals that precipitate are collected by filtration and dried to yield 6.6 g.; recrystallization from chloroform, M.P. 165–167° C.

*Analysis.*—Calcd. for $C_9H_{11}N_3S$: C, 55.92; H, 5.73; N, 21.74. Found: C, 55.73; H, 5.82; N, 21.87.

Example 2.—2-(2-Amino-4 (or 5)-nitroanilino)-5,6-dihydro-4H-1,3-thiazine hydrobromide 15.3 g. (0.1 mole) of 4-nitro-o-phenylenediamine is dissolved in 200 ml. of dry glyme. To this solution 18.0 g. (0.1 mole) of 3-bromopropyl isothiocyanate is added and the mixture stirred overnight at room temperature. The precipitated product is collected and recrystallized from methanol to yield 18.1 g., M.P. 196–198° C. yellow needles.

*Analysis.*—Calcd. for $C_{10}H_{12}N_4S \cdot HB\alpha$: C, 36.06; H, 3.94; N, 1681. Found: C, 36.36; H, 4.14; N, 16.93.

Example 3.—2-(o-Aminoanilino)-5-methyl-2-thiazoline

To 10 g. of 1-allyl-3-(o-aminophenyl)-2-thiourea there is added 40 ml. of concentrated hydrochloric acid and the resulting solution is kept at room temperature overnight. The solution is basified with concentrated ammonia and the resulting precipitate is filtered off and washed with water. Recrystallization from methanol yields 7.5 g.; M.P. 182° C.

*Analysis.*—Calcd. for $C_{10}H_{13}N_3S$: C, 57.84; H, 6.32; N, 20.27. Found: C, 58.02; H, 6.27; N, 20.16.

Example 4.—2-(2-Amino-4,5-dimethylanilino)-2-thiazoline

Following the procedure of Example 1 but replacing o-phenylenediamine with 4,5-dimethyl-o-phenylenediamine, the title compound is obtained, M.P. 178–180° C.

*Analysis.*—Calcd. for $C_{11}H_{15}N_3S$: C, 59.70; H, 6.83; N, 18.99. Found: C, 59.48; H, 6.92; N, 19.05.

Example 5.—2-(2-Amino-4,5-dimethylanilino)-5,6-dihydro-4H-1,3-thiazine, hydrobromide 2.7 g. (0.02 mole) of 4,5-dimethyl-o-phenylenediamine is dissolved in 200 ml. of dry glyme. To this solution 3.6 g. (0.02 mole) of 3-bromopropyl isothiocyanate in 75 ml. of dry glyme is added in a dropwise manner over a period of about one hour. After the reaction has proceeded for about 0.5 hour, a white precipitate begins to form. The reaction mixture is allowed to stir at room temperature for three hours and the precipitated white crystals are filtered off and washed with methanol and ether to yield 4.1 g. M.P. 124–127° C.

*Analysis.*—Calcd for $C_{12}H_{17}N_3S \cdot HBr$: C, 45.57; H, 5.74; N, 13.29. Found: C, 45.46; H, 5.77; N, 13.27.

Example 6.—2-(2-Amino-3(or 4)-nitroanilino)-2-thiazoline·HBr

A solution of 7.7 g. (0.05 mole) of 4-nitro-o-phenylenediamine and 8.3 g. (0.05 mole) of 2-bromoethyl isothiocyanate in 100 ml. of dry glyme is refluxed on a steam bath for one hour. The solid precipitate is filtered off and washed with water and ethyl ether to yield 8.3 g. The product is recrystallized from methanol to yield the analytically pure title compound, M.P. 204–206° C.

Examples 7 to 40

Following the procedure of Examples 1 and 2 but substituting the o-phenylenediamine derivative shown in column 1 of Table I below and the aliphatic haloalkyl isothiocyanate shown in column 2, the product shown in column 3 is obtained.

Where the o-phenylenediamine starting material is monosubstituted and includes a substituent at the 4 or 5 position, then the product shown in column 3 will include the 5-tautomer and/or 4-tautomer, respectively; where the o-phenylenediamine starting material is monosubstituted and includes a substituent at the 3- and/or 6-position, then the product shown in column 3 will include the 6-tautomer or 3-tautomer, respectively.

TABLE I

| Example | R¹ (position) | n | Haloalkylisothiocyanate | (R¹)ₙ (position) | R² |
|---|---|---|---|---|---|
| 7 | $(CH_3)_2N$ (4) | 1 | $SCN-CH_2-CH_2-Br$ | As in column 1 | |
| 8 | $C_2H_5O$ (5) | 1 | $SCN-CH_2-CH_2-Br$ | do | Same. |
| 9 | $C_4H_9$ (6) | 1 | $SCN-CH_2-CH_2-Br$ | do | Do. |
| 10 | $C_6H_{13}$ (4) | 1 | $SCN-CH_2-CH_2-Br$ | do | Do. |
| 11 | Cl (4,5) | 2 | $SCN-CH_2-CH_2-Br$ | do | Do. |
| 12 | $CH_3\overset{O}{\overset{\|}{C}}$ (5) | 1 | $SCN-CH_2-CH_2-Br$ | do | Do. |
| 13 | $C_6H_5(CH_2)_2$ (6) | 1 | $SCN-CH_2-CH_2-Br$ | do | Do. |
| 14 | $C_6H_5$ (4) | 1 | $SCN-CH_2-CH_2-Br$ | do | Do. |
| 15 | $C_6H_5\overset{O}{\overset{\|}{C}}$ (5) | 1 | $SCN-CH_2-CH_2-Br$ | do | Do. |

TABLE I—Continued

| | Column 1 | | Column 2 | Column 3 |
|---|---|---|---|---|
| Example | $R^1$ (position) | n | Haloalkylisothiocyanate | $(R^1)_n$ (position) / $R^2$ |
| 16 | $C_6H_5CH_2$ (4) | 1 | SCN—$CH_2CH_2CH_2$—Cl | As in column 1 |
| 17 | $C_6H_5CO$ (4) | 1 | SCN—$CH_2CH_2CH_2$—Cl | ......do...... Same. |
| 18 | $C_2H_5$ (4) | 1 | SCN—$CH_2CH_2CH_2$—Cl | ......do...... Do. |
| 19 | $C_2H_5O$ (4) | 1 | SCN—$CH_2CH_2CH_2$—Cl | ......do...... Do. |
| 20 | Cl, $CH_3$ (4,5) | 2 | SCN—$CH_2CH_2CH_2$—Cl | ......do...... Do. |
| 21 | $(C_2H_5)NH$ (5) | 1 | SCN—$CH_2CH_2CH_2$—Br | ......do...... Do. |
| 22 | $C_2H_5S$ (3) | 1 | SCN—$CH_2CH_2CH_2$—Br | ......do...... Do. |
| 23 | CN (5) | 1 | SCN—$CH_2CH_2CH_2$—Br | ......do...... Do. |
| 24 | $NO_2$ (4) | 1 | SCN—$CH_2CH_2CH_2$—Br | ......do...... Do. |
| 25 | $CH_3O$ (4) | 1 | SCN—$CH_2CH_2CH_2$—Br | ......do...... Do. |
| 26 | Br (4) | 1 | SCN—$CH_2CH_2CH_2$—Br | ......do...... Do. |
| 27 | $CF_3$ (5) | 1 | SCN—$CH_2CH_2CH_2$—Br | ......do...... Do. |
| 28 | H | | SCN—$CH_2CH$—Br / $C_6H_5$ | ......do...... |
| 29 | Br (4,5) | 2 | SCN—$CH_2$—$CH_2Br$ | ......do...... |
| 30 | $CH_3$ (3) | 1 | SCN—$CHCH_2Br$ / $CH_3$ | ......do...... |
| 31 | $C_6H_5S$ (4) | 1 | SCN—$CH_2CHBr$ | ......do...... |
| 32 | $p$-$CH_3C_6H_4$ (5) | 1 | SCN—$CH_2CH_2Br$ | ......do...... Same. |
| 33 | $NO_2$ (3) | 1 | SCN—$CH_2CH_2Cl$ | ......do...... Do. |
| 34 | H | | SCN—$CHCH_2$—Br / $C_2H_5$ | ......do...... |
| 35 | $C_6H_5\overset{O}{\overset{\|}{C}}$ (4) | 1 | SCN—$CH_2CH_2Br$ | ......do...... |
| 36 | $C_2H_5O$ (6) | 1 | SCN$CH_2CH_2Br$ | ......do...... Same. |
| 37 | $NO_2$ (6) | 1 | SCN$CH_2CH_2CH_2Br$ | ......do...... |
| 38 | Cl (4) | 1 | SCN$CH_2CH_2CH_2Br$ | ......do...... Same. |
| 39 | $C_6H_{11}$ (4) | 1 | SCN$CH_2CH_2CHBr$ / $C_6H_5$ | ......do...... |
| 40 | H | | SCN$CH_2CH_2CHCl$ / $C_6H_5$ | ......do...... Same. |

Examples 41 to 47

Following the procedure of Example 3 and utilizing the monothiourea derivative in column 1, Table II, and the mineral acid shown in column 2, the product shown in column 3 is obtained.

TABLE II

| | Column 1 | Column 2 | Column 3 | |
|---|---|---|---|---|
| Example | $R^1$ (position)   $n$   $R^2$ | Acid | $(R^1)_n$ (position) | $R^2$ |
| 41 | $CH_3$ (4, 5)    2    H | HCl | As in Column 1 | $CH_3$ |
| 42 | $NO_2$ (4)       1    H | HCl | ...do... | $CH_3$ |
| 43 | $C_4H_9$ (4)     1    H | HCl | ...do... | $CH_3$ |
| 44 | $C_6H_5\overset{O}{\underset{\|}{C}}$ (4)    1    H | HCl | ...do... | $CH_3$ |
| 45 | H              —    $CH_3$ | $H_2SO_4$ | ...do... | $C_2H_5$ |
| 46 | H              —    H | HCl | ...do... | $CH_3$ |
| 47 | Cl (4,5)       2    H | HCl | ...do... | $CH_3$ |

Example 48.—2'-(2-Thiazolin-2-ylamino)-2-thiophene-carboxanilide

A solution of 1.9 g. (0.01 mole) of 2-(o-aminoanilino)-2-thiazoline, 1.5 g. (0.01 mole) of thenoyl chloride and 1.0 g. (0.01 mole) of $Et_3N$ in 75 ml. of THF is refluxed for 0.5 hour over a steam bath. The resulting precipitate is removed by filtration, and the solvent is evaporated in vacuo to yield 1.5 g. of product (50%). Recrystallization from 95% EtOH yields an analytical sample, M.P. 167°.

Analysis.—Calcd. for $C_{14}H_{13}N_3OS_2$: C, 55.42; H, 4.32; N, 13.85. Found: C, 55.47; H, 4.49; N, 13.61.

Example 49.—N-[o-(2-Thiazolin-2-ylamino)anilino]-2-furamide

A solution of 3.0 g. (0.02 mole) of 2-(o-aminoanilino)-2-thiazoline, 2.1 g. (0.02 mole) of furoyl chloride and 1.6 g. (0.02 mole) of $Et_3N$ in 100 ml. of THF is refluxed for 0.5 hour over a steam bath. On cooling, the product precipitates in a yield of 1.5 g. (33%). Recrystallization from 95% EtOH gives an analytical sample, M.P. 159–161°.

Analysis.—Calcd. for $C_{14}H_{13}N_3O_2S$: C, 58.53; H, 4.56; N, 14.62. Found: C, 58.39; H, 4.73; N, 14.76.

Example 50.—4-Chloro-2'-(2-thiazolin-2-ylamino) benzanilide

A solution of 3.4 g. (0.02 mole) of 2-(o-aminoanilino)-2-thiazoline, 3.2 g. (0.02 mole) of p-chlorobenzoyl chloride and 1.8 g. (0.02 mole) of $Et_3N$ in 100 ml. of THF is refluxed for 0.5 hour over a steam bath. On cooling, the product precipitates to yield 2.9 g. (44%), M.P. 173–174°. Recrystallization from 95% EtOH gives analytical sample, M.P. 175–176°.

Analysis.—Calcd. $C_{16}H_{14}ClN_3OS$: C, 57.92; H, 4.25; N, 12.67. Found: C, 57.80; H, 4.13; N, 12.79.

Examples 51–55.—Preparation of Furamides

Following the procedure of Example 49, upon substituting in place of 2-(o-aminoanilino)-2-thiazoline, the following compounds:

2-(2-amino (or 5)-nitroanilino)-5,6-dihydro-4H-1,3-thiazine,
2-(o-aminoanilino)-5-methyl-2-thiazoline,
2-(2-amino-4,5-dimethylanilino)-2-thiazoline,
2-(2-amino-4,5-dimethylanilino)-5,6-dihydro-4H-1,3-thiazine, and
2-(2-amino-3 (or 4)-nitroanilino)-2-thiazoline, one obtains:

N-[o-(2-thiazin-2-ylamino)-4 (or 5)-nitroanilino]-2-furamide,
N-[o-(2-(5-methyl)thiazolin-2-ylamino)anilino]-2-furamide,
N-[o-(2-thiazolin-2-ylamino)-4,5-dimethylanilino]-2-furamide,
N-[o-(2-thiazin-2-ylamino)-4,5-dimethylanilino]-2-furamide, and
N-[o-(2-thiazolin-2-ylamino)-3 (or 4)-nitroanilino]-2-furamide, respectively.

Examples 56–60.—Preparation of Benzamides

Following the procedure of Example 50, upon substituting in place of 2-(o-aminoanilino)-2-thiazoline, the following compounds:

2-(o-aminoanilino)-5,6-dihydro-4H-1,3-thiazine,
2-(o-aminoanilino)-5-methyl-2-thiazoline,
2-(2-amino-4,5-dimethylanilino)-2-thiazoline,
2-(2-amino-4,5-dimethylanilino)-5,6-dihydro-4H-1,3-thiazine, hydrobromide, and
2-(2-amino-3) (or 4)-nitroanilino)-2-thiazoline, one obtains:

4-chloro-2'-(2-thiazin-2-ylamino)benzanilide,
4-chloro-2'-(2-(5-methyl)thiazolin-2-ylamino)benzanilide,
4-chloro-2'-(2-thiazolin-2-ylamino)-4',5'-dimethylbenzanilide,
4-chloro-2'-(2-thiazin-2-ylamino)-4',5'-dimethylbenzanilide, and
4-chloro-2'-(2-thiazolin-2-ylamino)-3'(or 4')-nitrobenzanilide.

Examples 61–101.—Preparation of Thiophenecarboxanilides

Following the procedure of Example 48, upon substituting the compounds of Tables I and II in place of 2-(o-aminoanilino)-2-thiazoline one obtains the respective 2-thiophenecarboxanilide derivative.

Examples 102–116.—Preparation of Amides of 2-(o-Aminoanilino)-2-thiazoline

Following the procedure of Example 48, upon substituting in place of thenoyl chloride, the following compounds:

thiazole-4-carbonylchloride,
pyridine-2-carbonylchloride,
thiophene-3-carbonylchloride,
1-methylpyrrole-2-carbonylchloride,
quinoline-4-carbonylchloride,
isoquinoline-7-carbonylchloride,
m-ethylbenzoyl chloride, p-methoxybenzoyl chloride,
o-fluorobenzoyl chloride,
3,4-dimethylbenzoyl chloride,
2-thiopheneacryloyl chloride,
2-furanacryloyl chloride,
3-pyridineacryloyl chloride,
3-indoleacryloyl chloride, and
cinnamoyl chloride, one obtains:

2'-(2-thiazolin-2-ylamino)-4-thazolecarboxanilide,
2-(2-thiazolin-2-ylamino)-2-pyridinecarboxanilide,
2'-(2-thiazolin-2-ylamino)-3-thiophenecarbonxanilide,
1-methyl-2'-(2-thiazolin-2-ylamino)-2-pyrolecarboxanilide,
2'-(2-thiazolin-2-ylamino)-4-quinolinecarboxanilide,
2'-(2-thiazoline-2-ylamino)-7-isoquinolinecarboxanilide,
3-ethyl-2'-(2-thiazolin-2-ylamino)benzanilide,
4-methoxy-2'-(2-thazolin-2-ylamino)benzanilide,
2-fluoro-2'-(2-thiazolin-2-ylamino)benzanilide,
3,4-dimethyl-2'-(2-thiazolin-2-ylamino)benzanilide,
2'-(2-thiazolin-2-ylamino)-2-thiopheneacrylanilide,
2'-(2-thiazolin-2-ylamino)-2-furanacrylanilide,
2'-(2-thazolin-2-ylamino)-3-pyridineacrylanilide,
2'-(2-thiazolin-2-ylamino)-3-indoleacrylanilide, and
2'-(2-thiazolin-2-ylamino)cinnamanilide, respectively.

Examples 117–126.—Preparation of Amides of 2-(o-aminoanilino)-2-thiazines

Following the procedure of Example 48, upon substituting in place of the 2-(o-aminoanilino)-2-thiazoline, the compound 2-(o - aminoanilino)-5,6-dihydro-4H-1,3-thiazine and upon substituting in place of thenoyl chloride, the following compounds:

benzofuran-3-carbonyl chloride,
pyridine-3-carbonyl chloride,
m-nitrobenzoyl chloride,
p-triflouromethylbenzoyl chloride,
2-methyl-3-bromobenzoyl chloride,
2-thiopheneacryloyl chloride,
2-furanacryloyl chloride,
3-pyridineacryloyl chloride,
3-indoleacryloyl chloride, and
cinnomoyl chloride, one obtains:

2'-(2-thiazin-2-ylamino)-3-benzofurancarboxanilide,
2'-(2-thiazin-2-ylamino)-3-pyridinecarboxanilide,
3-nitro-2'-(2-thiazin-2-ylamino)benzanilide,
4-trifluoromethyl-2'-(2-thiazin-2-ylamino)benzanilide,
2-methyl-3-bromo-2'-(2-thiazin-2-ylamino)benzanilide,
2'-(2-thiazin-2-ylamino)-2-thiopheneacrylanilide,
2'-(2-thiazin-2-ylamino)-2-furanacrylanilide,
2'-(2-thiazin-2-ylamino)-3-pyridineacrylanilide,
2'-(2-thiazin-2-ylamino)-3-indoleacrylanilide, and
2'-(2-thiazin-2-ylamino)cinnamanilide, respectively.

What is claimed is:
1. A compound of the formula

$$(R^1)_a \underset{}{\underset{}{\bigcirc}} \begin{matrix} -NH-\overset{O}{\overset{\|}{C}}-(CH=CH)_{n'}-R \\ -NHZ \end{matrix}$$

wherein R is selected from the group consisting of thienyl, furyl, thiazolyl, 1-methyl pyrryl, pyridyl, quinolinyl, isoquinolinyl, benzofuryl, indolyl, phenyl, and monon and disubstituted phenyl wherein said phenyl substituents are selected from the group consisting of halogen, nitro, $CF_3$, lower alkyl, and lower alkoxy; and $R^1$ is selected from the group consisting of hydrogen, lower alkyl, phenyl, benzyl, phenethyl, p-tolyl, nitro, halogen, amino, lower alkylamino, dilower alkylamino, $CF_3$, CN, lower alkylthio, phenylthio, $$-\overset{O}{\overset{\|}{C}}-$$

benzoyl, and lower alkoxy; and $n$ is selected from the group of integers consisting of one and two, and $n'$ is selected from the group of integers consisting of zero and one; and Z is selected from the group consisting of $$-\underset{S}{\overset{N}{\langle}}\rangle-R^2 \text{ and } -\underset{S}{\overset{N}{\langle}}\rangle-R^2$$

wherein $R^2$ is selected from the group consisting of hydrogen, lower alkyl, and phenyl; and when $R^1$ is selected from the group consisting of amino, lower alkylamino, and dilower alkylamino, the acid addition salts thereof.

2. The compounds of claim 1 wherein $R^1$ and $R^2$ are both hydrogen; $n$ is one, and Z is thiazoline.
3. The compound of claim 1 wherein $n'$ is zero.
4. The compounds of claim 3 wherein $R^1$ and $R^2$ are both hydrogen; $n$ is one; and Z is thiazoline.
5. A compound of the formula $$(R^1)_a \underset{}{\underset{}{\bigcirc}} \begin{matrix} -NH-\overset{O}{\overset{\|}{C}}-R \\ -NHZ \end{matrix}$$

wherein R is selected from the group consisting of thienyl, furyl, thiazolyl, pyridyl, 1-methyl pyrryl, quinolinyl, isoquinolinyl, benzofuryl, phenyl, and mono and disubstituted phenyl wherein said phenyl substituents are selected from the group consisting of halogen, nitro, trifluoromethyl, lower alkyl, and lower alkoxy;and $R^1$ is selected from the group consisting of hydrogen, lower alkyl, phenyl, benzyl, phenethyl, p-tolyl, nitro, halogen, amino, lower alkylamino, dilower alkylamino, $CF_3$, CN, lower alkylthio, phenylthio, $$-\overset{O}{\overset{\|}{C}}-$$

benzoyl, and lower alkoxy; and $n$ is selected from the group of integers consisting of one and two, and Z is selected from the group consisting of $$-\underset{S}{\overset{N}{\langle}}\rangle-R^2 \text{ and } -\underset{S}{\overset{N}{\langle}}\rangle-R^2$$

wherein $R^2$ is selected from the group consisting of hydrogen, lower alkyl, and phenyl; and when $R^1$ is selected from the group consisting of amino, lower alkylamino, and dilower alkylamino, the acid addition salts thereof.

6. The compounds of claim 5 wherein R is selected from the group consisting of 2-thienyl, 2-furyl, and mono and disubstituted phenyl; and $R^1$ and $R^2$ are both hydrogen; and $n$ is one; and Z is thiazoline.
7. The compound of claim 6 having the name 2'-(2-thiazolin-2-ylamino)-2-thiophenecarboxanilide.
8. The compound of claim 6 having the name N-[o-(2-thiazolin-2-ylamino)anilino]-2-furamide.
9. The compound of claim 6 having the name 4-chloro-2'-(2-thiazolin-2-ylamino)benzanilide.
10. The compound of claim 5 having the name 2'-(2-[5.6 - dihydro-4H-1,3-thiazin-2-yl]amino-2-thiophene carboxanilide.

References Cited

UNITED STATES PATENTS 3,721,710    3/1973    Krapcho _____ 260—562 R

OTHER REFERENCES

Morrison, et al.; Org. Chem. (Allyn & Bacon, Boston, 1959) pp. 534, 535.

HENRY R. JILES, Primary Examiner

C. M. S. JAISLE, Assistant Examiner

U.S. Cl. X.R.

260—243 R, 250 R, 256.5 R, 287 R, 294.8 D, 302 H, 304, 306.7; 424—246, 250, 251, 258, 263, 270

UNITED STATES PATENT OFFICE
CERTIFICATE OF CORRECTION

Patent No. 3,816,414　　　　　　　Dated June 11, 1974

Inventor(s) Venkatachala Lakshmi Narayanan, Rudiger Dieter Haugwitz

It is certified that error appears in the above-identified patent and that said Letters Patent are hereby corrected as shown below:

Column 3, line 38, "H$^\ominus$" should read -- H$^\oplus$ --.

Column 3, lines 60-64, a semicolon (;) should follow
" 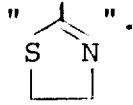 ".

Column 3, line 72, "n is zero" should read -- n' is zero --.

Column 4, line 52, cancel "the" after "with".

Column 4, line 53, "dilutents" should read -- diluents --.

Column 4, line 64, "dipesred" should read -- dispersed --.

Column 4, line 65, "dilutent" should read -- diluent --.

Column 5, line 34, "N, 1681." should read -- N, 16.81. --.

Column 10, line 44, "(2-amino-3)" should read -- (2-amino-3 --.

Column 11, line 10, "thazolecarboxanilide" should read -- thiazolecarboxanilide --.

Column 11, line 11, "2-(2-" should read -- 2'-(2- --.

Column 11, line 13, "pyrolecar-" should read --pyrrolecar- --.

Column 11, line 18, "thazolin" should read -- thiazolin --.

Column 11, line 23, "thazolin" should read --thiazolin --.

UNITED STATES PATENT OFFICE
CERTIFICATE OF CORRECTION

Patent No. 3,816,414  Dated June 11, 1974  (Page 2)

Inventor(s) Venkatachala Lakshmi Narayanan, Rudiger Dieter Haugwitz

It is certified that error appears in the above-identified patent and that said Letters Patent are hereby corrected as shown below:

Column 11, line 65, "monon" should read -- mono --.

Column 11, lines 73-75, "$-\overset{\overset{O}{\|}}{C}-$" should read -- lower alkyl$-\overset{\overset{O}{\|}}{C}-$, --.

Column 12, line 34 and 35, "$-\overset{\overset{O}{\|}}{C}-$" should read -- lower alkyl$-\overset{\overset{O}{\|}}{C}-$, --.

Column 12, line 57, "[5.6" should read -- [5,6 --.

Column 12, line 57, "amino" should read -- amino) --.

Signed and sealed this 24th day of September 1974.

(SEAL)
Attest:

McCOY M. GIBSON JR.
Attesting Officer

C. MARSHALL DANN
Commissioner of Patents